United States Patent
Yamada et al.

(10) Patent No.: US 6,841,960 B2
(45) Date of Patent: Jan. 11, 2005

(54) VEHICULAR MIRROR ANGLE CONTROLLER

(75) Inventors: Ayako Yamada, Fujieda (JP); Mituyoshi Nagao, Fujieda (JP); Hidenori Sato, Fujieda (JP)

(73) Assignee: Murakami Corporation, Shizuoka (JP)

( * ) Notice: Subject to any disclaimer, the term of this patent is extended or adjusted under 35 U.S.C. 154(b) by 99 days.

(21) Appl. No.: 10/410,233

(22) Filed: Apr. 10, 2003

(65) Prior Publication Data

US 2003/0214738 A1 Nov. 20, 2003

(30) Foreign Application Priority Data

Apr. 19, 2002 (JP) ....................................... 2002-117393

(51) Int. Cl.[7] ................................................ G05B 5/00
(52) U.S. Cl. ........................ 318/468; 318/466; 359/877
(58) Field of Search ................................. 318/445, 446, 318/466, 468; 359/874, 876, 877; 250/206

(56) References Cited

U.S. PATENT DOCUMENTS

| | | | | |
|---|---|---|---|---|
| 4,833,376 A | * | 5/1989 | Shimura | 318/286 |
| 5,315,442 A | * | 5/1994 | Sato et al. | 359/877 |
| 5,496,759 A | * | 3/1996 | Yue et al. | 438/3 |
| 5,497,326 A | * | 3/1996 | Berland et al. | 701/36 |
| 5,823,054 A | * | 10/1998 | Brouwer | 74/425 |
| 5,952,802 A | * | 9/1999 | Pimley | 318/468 |
| 6,140,933 A | * | 10/2000 | Bugno et al. | 340/693.5 |
| 6,580,992 B2 | * | 6/2003 | Whitten et al. | 701/49 |
| 6,583,591 B2 | * | 6/2003 | Echols et al. | 318/112 |
| 6,621,062 B1 | * | 9/2003 | Tamagawa et al. | 250/206 |
| 2002/0052680 A1 | * | 5/2002 | Whitten et al. | 701/49 |
| 2002/0117980 A1 | * | 8/2002 | Echols et al. | 318/34 |
| 2003/0193340 A1 | * | 10/2003 | Holmquist et al. | 324/710 |

* cited by examiner

*Primary Examiner*—Paul Ip
(74) *Attorney, Agent, or Firm*—Oblon, Spivak, McClelland, Maier & Neustadt, P.C.

(57) ABSTRACT

In response to an operation of reversing a vehicle, a tilt motor is rotated by a specific amount in a normal direction to tilt a mirror angle to a position that permits a mirror to provide the driver with a view of the area near a rear wheel of the vehicle, while in response to an operation of releasing the reverse gear, the tilt motor is rotated by a specific amount in a reverse direction to restore the tilt angle to a normal position thereof. During the operations, a high-frequency signal generated upon switching a brush of the motor is detected using a pickup coil to determine an amount of rotation of the motor. One and the same pickup coil may be used for detection during both of normal and reverse rotations. A voltage of a battery 3 is stabilized in a motor power stabilizing circuit 10, and supplied via a motor driving circuit 8 to a tilt motor M2. Polarity of the voltage outputted from the motor power stabilizing circuit 10 is fixed. Polarity of the voltage outputted from the motor driving circuit 8 is switchable according to a switching operation of the motor driving circuit 8 based upon a driving direction instruction. The pickup coil L10 is provided between the motor power stabilizing circuit 10 and the motor driving circuit 8.

8 Claims, 9 Drawing Sheets

VEHICULAR MIRROR ANGLE CONTROLLER

FIELD OF THE INVENTION

This invention relates to a vehicular mirror angle controller that controls a tilt angle of a mirror for a vehicle, such as a door mirror and a sideview mirror.

DESCRIPTION OF RELATED ARTS

In general, passenger automobiles, station wagons, trucks and other vehicles are equipped with door mirrors, sideview mirrors or other types of rearview mirrors to provide the driver with a view of the area behind the vehicle for safety reasons. Such rearview mirrors typically include an angle-adjusting actuator with a remote control for setting a mirror angle at a position suitable for the driver, so that the driver may adjust the mirror angle to his/her preferred position or orientation by operating the remote control in the driver's seat.

When the driver is backing a vehicle for example into a garage, the driver is preferably provided with a view of the area near a rear wheel of the vehicle. With the aforementioned angle-adjusting actuator, however, in order to tilt the mirror angle downward to provide the driver with a view of the area near a rear wheel of the vehicle, the driver has to operate a remote control button for mirror angle adjustments on all such occasions. Similarly, in order to restore the angle back to a normal position as well, the driver has to operate the remote control button in the same way. Consequently, the driver would disadvantageously be deprived of comfort and convenience each time.

Under these circumstances, a conventional mirror device, as disclosed in Japanese Laid-Open Utility Model Application, Publication No. 4-95846 available on CD-ROM (hereinafter referred to as Prior Art 1), has been proposed and put to practical use, which detects that the shift lever is operated to slip the gear of the vehicle into reverse, to automatically change the mirror angle to a desired tilt position.

In Prior Art 1, once an operation of the automatic-transmission shift lever into reverse gear is detected, a detection signal is generated, and the detection signal triggers an automatic downward tilting action of the rearview mirror by which the rearview mirror tilts at a predetermined tilt angle so as to provide the driver with a view of the area near the rear wheel of the vehicle. On the other hand, when an operation to release the gear from the reverse position is detected, the tilt angle of the rear view mirror is restored to an original angle. Further, the conventional device in Prior Art 1 includes a delay timer circuit that is used to prevent the mirror from tilting downward when a transient state of the gear in the reverse position is detected, for example when the shift lever is passed on through the reverse position of the gear (e.g., for changing the gear from Parking position to Driving position). Such an arrangement as in Prior Art 1 permits an automatic tilting operation of the mirror upon reversing of the vehicle, and thus may advantageously relieve the driver of an inconvenient operation, enhancing the usability of the mirror device.

However, in this arrangement, repeated operations of tilting the mirror in synchronization with the reverse gear shift would disadvantageously cause the mirror to be gradually shifted out of a proper position. This phenomenon will be described below in detail. Hereupon, a position of the mirror that gives the driver a rear view will be referred to as "normal position", and a position of the mirror that gives the driver a view of the area near the rear wheel of the vehicle will be referred to as "set position". A rotary action of a tilt motor that tilts the mirror from the normal position to the set position will be referred to as "normal rotation" or rotation in the normal direction, and a rotary action of the tilt motor that tilts the mirror from the set position to the normal position will be referred to as "reverse rotation" or rotation in the reverse direction.

When the shift lever is operated to slip the gear of the vehicle into reverse, a signal is generated and transmitted to actuate the mirror to rotate from the normal position to the set position. At this stage, the mirror does not necessarily stop precisely at the set position, but rather coasts a little farther and tilts slightly as the tilt motor coasts even after a voltage supply to the tilt motor has been cut off. On the other hand, when the gear is released from the reverse position, the mirror rotates in the reverse direction from the set position to the normal position. At this stage, as is the case with the normal rotation, the mirror does not necessarily stop precisely at the normal position, but rather coasts a little farther and tilts slightly as the tilt motor coasts even after the voltage supply to the tilt motor has been cut off.

Since the angular displacement which takes place when the mirror coasts in the normal direction is in many instances different from that which takes place when the mirror coasts in the reverse direction, a plurality of tilting motions of the mirror alternately repeated in the normal and reverse directions would result in accumulation of residuals derived from the difference in the angular displacements of the coasting mirror, whereby the tilt angle of the mirror would disadvantageously shift by degrees.

In the meantime, in cases, for example, when a driver is making an attempt to get into an expressway, the driver is preferably be provided with a wide view of the area at the side of the vehicle for safety reasons. However, changing a viewable range of the mirror through operation of the above-mentioned angle-adjusting actuator is not an easy task especially upon getting into an expressway. Accordingly, a conventional technique, as disclosed in Japanese Laid-Open Utility Model Application, Publication No. 58-29540 on microfilm (hereinafter referred to as Prior Art 2), is known in the art, which detects an ON signal of a blinker, and in response thereto automatically tilts the mirror angle of the rearview mirror to the right or to the left. In Prior Art 2, however, like the above Prior Art 1, the same problem would be encountered; i.e., a plurality of rotary motions of the tilt motor alternately repeated in the normal and reverse directions would disadvantageously cause the tilt angle of the mirror to be gradually shifted out of a proper position.

As described above, conventional mirror angle controllers that have been proposed include one that tilts the mirror angle downward (to a position that gives the driver a view of the area near a rear wheel of the vehicle) in synchronism with the reverse gear, and one that tilts the mirror angle laterally in synchronism with the blinker. Such conventional mirror angle controllers however involve the drawback of allowing the mirror angle to be gradually shifted through repeated operations of tilting the mirror angle in synchronism with the reverse gear or the blinker.

Against the backdrop, another vehicular mirror angle controller that can correct the mirror angle shifted through the operations of tilting the mirror angle in response to an external signal such as transmitted from a reverse gear or a blinker, and thus can eliminate the aforementioned disadvantage, has been disclosed in Japanese Laid-Open Patent Application, Publication No. 2001-38812 (hereinafter referred to as Prior Art 3). The mirror angle controller as in the Prior Art 3 is configured to detect a high-frequency signal that is generated when a brush is switched during rotation of the tilt motor, to count the number of pulses in the high-frequency signal. When the tilt motor is rotated in the normal or reverse direction to adjust the mirror angle to the set position or the normal position, the number of pulses in the high-frequency signal corresponding to extra rotation of the tilt motor that has coasted beyond the set position or the normal position is detected as an excess count. When the tilt motor is rotated in the normal direction or the reverse direction next time so as to adjust the mirror angle to the set position or the normal position, the tilt angle in the normal or reverse direction is corrected according to the excess count. With this operation, the mirror angle, which would otherwise be shifted, can be corrected each time, and thus even if a mirror angle control operation in response to an external signal is repeatedly performed more than once, the mirror angle is not shifted but can always be adjusted at an appropriate angle.

Figure 2:
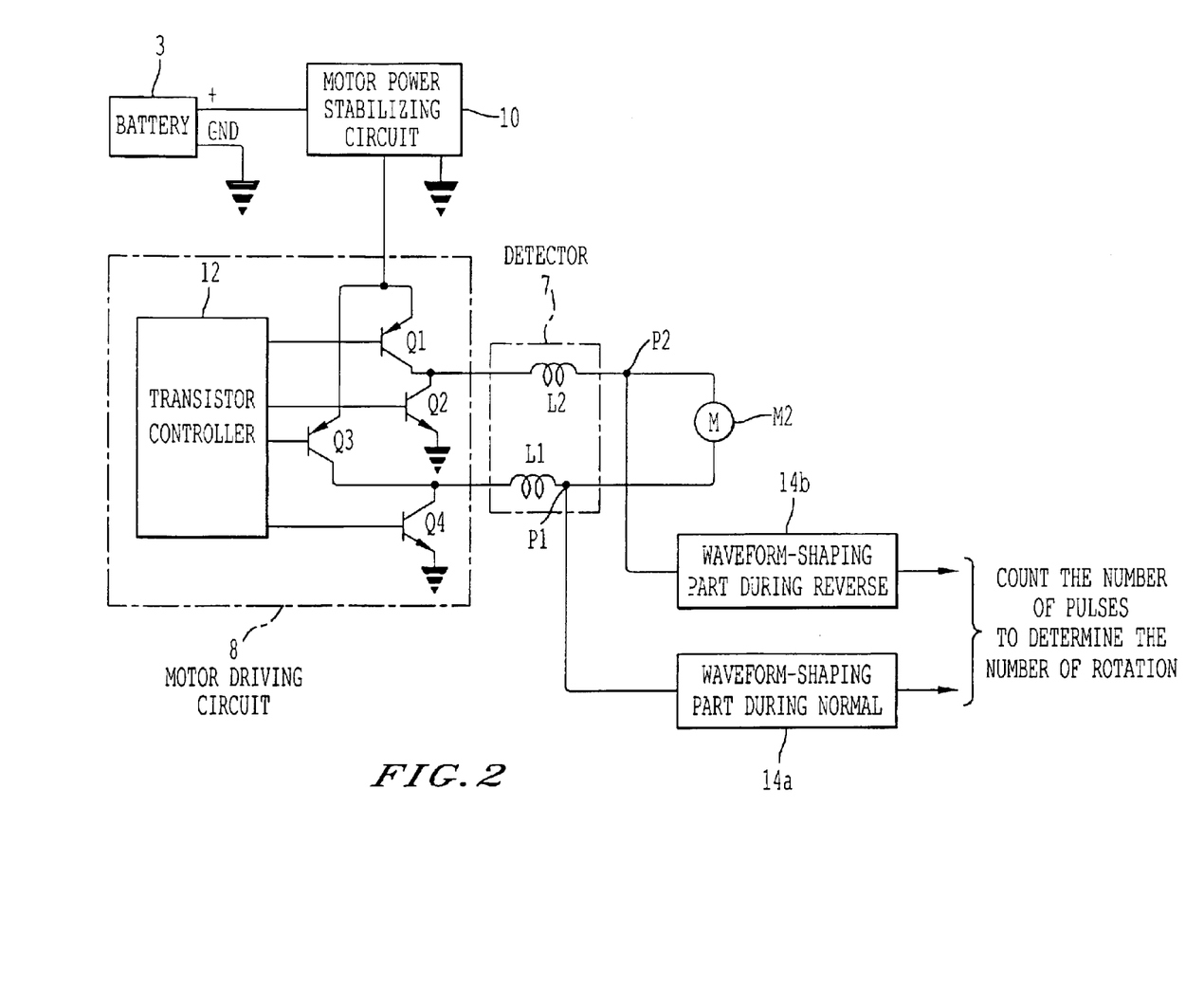
FIG. 2 is a circuit diagram of a conventional device.

In the arrangement as disclosed in Prior Art 3, a pickup coil is placed in a feed line of the tilt motor, to detect a high-frequency signal generated when the brush is switched during rotation of the tilt motor. FIG. 2 is a schematic diagram indicating a circuit for detecting a high-frequency signal as disclosed in Prior Art 3. A direct current voltage output from a battery 3 is stabilized in a motor power stabilizing circuit 10, and is supplied to a motor driving circuit 8. The motor driving circuit 8 supplies a voltage to a vertical motion motor M2 comprised of a direct current brush motor with a polarity thereof reversible, and thus controls normal and reverse rotations of the vertical motion motor M2. The motor driving circuit 8 is comprised of a transistor controller 12 and four transistors Q1–Q4. The transistor controller 12 brings the transistors Q1, Q4 into conduction when the vertical motion motor M2 is to be rotated in the normal direction, while bringing the transistors Q2, Q3 into conduction when the vertical motion motor M2 is to be rotated in the reverse direction. When all of the transistors Q1–Q4 are cut off, the vertical motion motor M2 is stopped. In feed lines extending from the motor driving circuit 8 to the vertical motion motor M2 is provided a detector 7 that detects a high-frequency signal generated when the brush is switched during rotation of the vertical motion motor M2. The detector 7 is comprised of two pickup coils L1, L2 placed in the two feed lines extending the motor driving circuit 8 to the vertical motion motor M2, respectively. The pickup coil L1 detects a high-frequency signal that is generated when the brush is switched during the normal rotation, whereas the pickup coil L2 detects a high-frequency signal that is generated when the brush is switched during the reverse rotation.

Figure 3A:
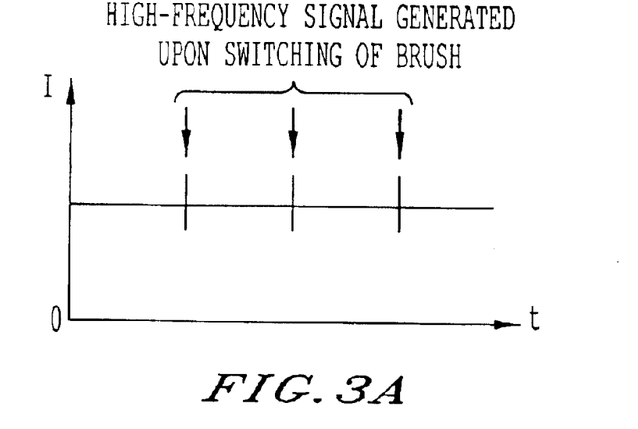
FIG. 3 depicts waveforms of each section of the conventional device as shown in FIG. 2 during normal rotation.
Figure 3B:
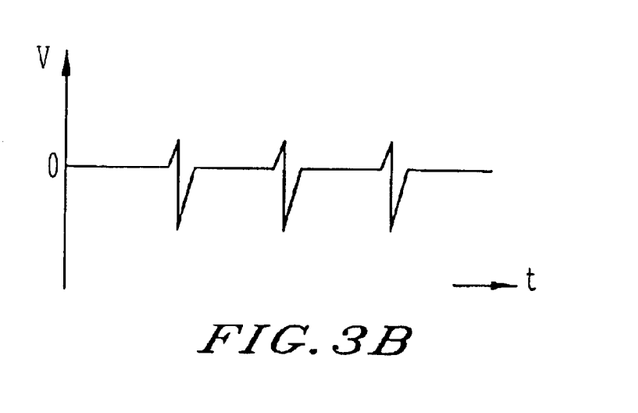
Figure 3C:
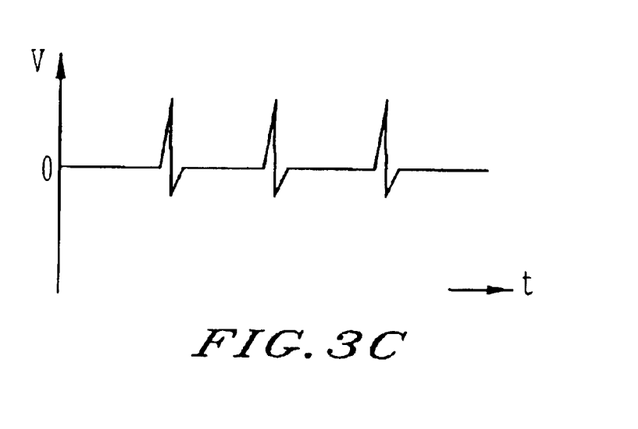

FIG. 3 shows waveforms of each section in the circuit as shown in FIG. 2 during the normal rotation (when the transistors Q1, Q4 are brought into conduction). Depicted in (a) is a waveform of a current that conducts through the vertical motion motor M2 in which periodical generation of high-frequency signals is shown; depicted in (b) is a waveform of a high-frequency component of a voltage that is applied at a terminal P1 of the pickup coil L1 when the current conducts through the vertical motion motor M2; and depicted in (c) is a waveform of a high-frequency component of a voltage that is applied at a terminal P2 of the pickup coil L2 when the current conducts through the vertical motion motor M2. A waveform-shaping part 14a shapes a high-frequency signal detected in the pickup coil L1 during the normal rotation as shown in FIG. 3(b) into a rectangular wave pulse signal. A waveform-shaping part 14b shapes a high-frequency signal similar to that shown in FIG. 3(b) detected in the pickup coil L2 during the reverse rotation into a rectangular waver pulse signal. An output pulse of the waveform-shaping part 14a is counted in a counter provided in a downstream stage, and a rotation amount during the normal rotation is obtained. An output pulse of the waveform-shaping part 14b is counted in a counter provided in a downstream stage, and a rotation amount during the reverse rotation is obtained.

With the arrangement as disclosed in Prior Art 3 as indicated by the circuit diagram in FIG. 2, since the two pickup coils L1, L2 provided in the feed lines to the vertical motion motor M2 could be subject to interaction with each other, the detected high-frequency signals would disadvantageously be reduced by half in magnitude, and resulting desensitization of the detector 7 would lead to errors in mirror angle control, and accumulation of such errors. In addition, the both of the pickup coils and waveform-shaping parts need be separately equipped for detection upon normal rotation and for detection upon reverse rotation respectively, and thus the arrangement of the circuit need be more complicated, which would inevitably increase cost.

This invention has been made with consideration given to the above-described disadvantages.

SUMMARY OF THE INVENTION

It is an exemplified general object of the present invention to provide a vehicular mirror angle controller in which performance in detection can be improved, and an arrangement of circuitry can be simplified.

According to one exemplified aspect of the present invention, there is provided a vehicular mirror angle controller comprises: a tilt motor comprised of a direct current brush motor that adjusts a mirror angle; a motor driving circuit that drives the tilt motor to rotate; a feed line for the tilt motor that provides connection from a direct current power supply via the motor driving circuit to the tilt motor; and a pickup coil provided in the feed line between the direct current power supply and the motor driving circuit to detect a high-frequency signal that is generated when a brush is switched during rotation of the tilt motor. If an instruction is given to rotate the tilt motor by a specified amount in one direction (e.g., normal direction) or in the other direction (e.g., reverse direction), the controller drives the tilt motor to rotate in the instructed direction, and controls an operation of the tilt motor according to an actual rotation amount of the tilt motor determined based upon the high-frequency signal detected by the pickup coil. In addition, polarity between the direct current power supply and the motor driving circuit is fixed, while polarity between the motor driving circuit and the tilt motor is switched according to a switching operation of the motor driving circuit based upon a driving direction instruction. Further, one and the same pickup coil is used to detect the high-frequency signal on both occasions where the tilt motor is rotated in the above one direction (i.e., normal direction, for example) and where the tilt motor is rotated in the other of the other direction (i.e., reverse direction, for example).

A vehicular mirror angle controller according to another exemplified aspect of the present invention comprises: a tilt motor comprised of a direct current brush motor to which a power supply voltage is manually applied to drive the tilt motor to rotate, so as to make a mirror angle adjustable, the tilt motor being controlled to normally rotate to tilt a mirror to a desired set position in response to a supply of an external signal, while being controlled to reversely rotate to return the mirror to a normal position in response to suspension of the supply of the external signal; a motor driving circuit that drives the tilt motor to rotate; a feed line for the tilt motor that provides connection from a direct current power supply via the motor driving circuit to the tilt motor; a pickup coil provided in the feed line between the direct current power supply and the motor driving circuit to detect a high-frequency signal that is generated when a brush is switched during rotation of the tilt motor; a pulse counter that counts the number of pulses in the high-frequency signal detected by the pickup coil; and a rotation angle correcting means that detects as an excess count value the number of pulses in the high-frequency signal corresponding to extra rotation of the tilt motor coasting beyond the set position when the tilt motor is normally rotated to adjust the mirror angle to the set position and beyond the normal position when the tilt motor is reversely rotated to adjust the mirror angle to the normal position, and based upon the detected excess count value corrects a rotation amount of the mirror to be rotated next time when the tilt motor is reversely rotated to adjust the mirror angle to the normal position and when the tilt motor is normally rotated to adjust the mirror angle to the set position. Polarity between the direct current power supply and the motor driving circuit is fixed, while polarity between the motor driving circuit and the tilt motor is switched according to a switching operation of the motor driving circuit based upon a driving direction instruction. In addition, one and the same pickup coil is used to detect the high-frequency signal on both occasions where the tilt motor is normally rotated and where the tilt motor is reversely rotated.

A vehicular mirror angle controller according to yet another aspect of the present invention comprising: a tilt motor comprised of a direct current brush motor to which a power supply voltage is manually applied to drive the tilt motor to rotate, so as to make a mirror angle adjustable, the tilt motor being controlled to normally rotate to tilt a mirror to a desired set position in response to a supply of an external signal, while being controlled to reversely rotate to return the mirror to a normal position in response to suspension of the supply of the external signal; a motor driving circuit that drives the tilt motor to rotate in one of normal and reverse directions based upon a motor drive control signal; a feed line for the tilt motor that provides connection from a direct current power supply via the motor driving circuit to the tilt motor; a pickup coil provided in the feed line between the direct current power supply and the motor driving circuit to detect a high-frequency signal that is generated when a brush is switched during rotation of the tilt motor; a pulse counter that counts the number of pulses in the high-frequency signal detected by the pickup coil; a reference count value setting means that sets as a reference count value the number of pulses in the high-frequency signal counted by the pulse counter when the tilt motor is normally rotated to adjust the mirror angle to the set position and when the tilt motor is reversely rotated to adjust the mirror angle to the normal position; an excess count value storing means that stores as an excess count value the number of pulses in the high-frequency signal corresponding to extra rotation of the tilt motor coasting beyond the set position when the tilt motor is normally rotated to adjust the mirror angle to the set position and beyond the normal position when the tilt motor is reversely rotated to adjust the mirror angle to the normal position; and a motor drive controller that outputs a motor drive control signal instructing the tilt motor to rotate next time reversely to adjust the mirror angle to the normal position and normally to adjust the mirror angle to the set position by such a rotation amount that the number of pulses in the high-frequency signal to be generated when the tilt motor is rotated becomes the number of pulses obtained by adding the excess count value to the reference count value. Polarity between the direct current power supply and the motor driving circuit is fixed, while polarity between the motor driving circuit and the tilt motor is switched according to a switching operation of the motor driving circuit based upon a driving direction instruction. In addition, one and the same pickup coil is used to detect the high-frequency signal on both occasions where the tilt motor is normally rotated and where the tilt motor is reversely rotated.

According to the present invention as exemplified above, one and the same pick up coil may be employed for detection during rotation in both of the opposite (e.g., normal and reverse) directions, and thus no separate pick up coils need be provided for detection during rotation in each of the opposite directions. Accordingly, the pickup coil would never be subject to such interaction with each other, as in some of the conventional arrangements as described above which requires separate pickup coils for detection during rotation in each of the directions. Accordingly, the high-frequency signal can be detected with improved sensitivity, so that errors in controlling the mirror angle may be reduced, and accumulation of such errors can be avoided. Moreover, the pickup coil and processing circuits for signals detected in the pickup coil (e.g., waveform-shaping circuit, etc.) can be a single unit that functions during both of the normal and reverse rotations, and thus an arrangement of circuitry can be simplified and production costs to be incurred can be reduced.

The above vehicular mirror angle controller according to the present invention may preferably include a waveform-shaping means that shapes a waveform of the high-frequency signal detected by the pickup coil so as to generate a rectangular wave as a unit corresponding to one switching operation of a brush; and a rectangular wave generating means that generates another rectangular wave which is turned on and kept for a specific period in synchronization with timing of generation of the rectangular wave as a unit. The pulse counter in this arrangement counts the number of pulses in a pulse signal obtained through a logic operation of an output signal from the waveform-shaping means and an output signal from the rectangular wave generating means.

In the above vehicular mirror angle controller according to the present invention, preferably, the above direct current power supply may include a battery and a motor power stabilizing circuit that stabilizes an output voltage of the battery to supply the stabilized voltage to the motor driving circuit, and the above pickup coil may be provided between the motor power stabilizing circuit and the motor driving circuit.

Other objects and further features of the present invention will become readily apparent from the following description of preferred embodiments with reference to accompanying drawings.

DESCRIPTION OF THE PREFERRED EMBODIMENTS

Figure 1:
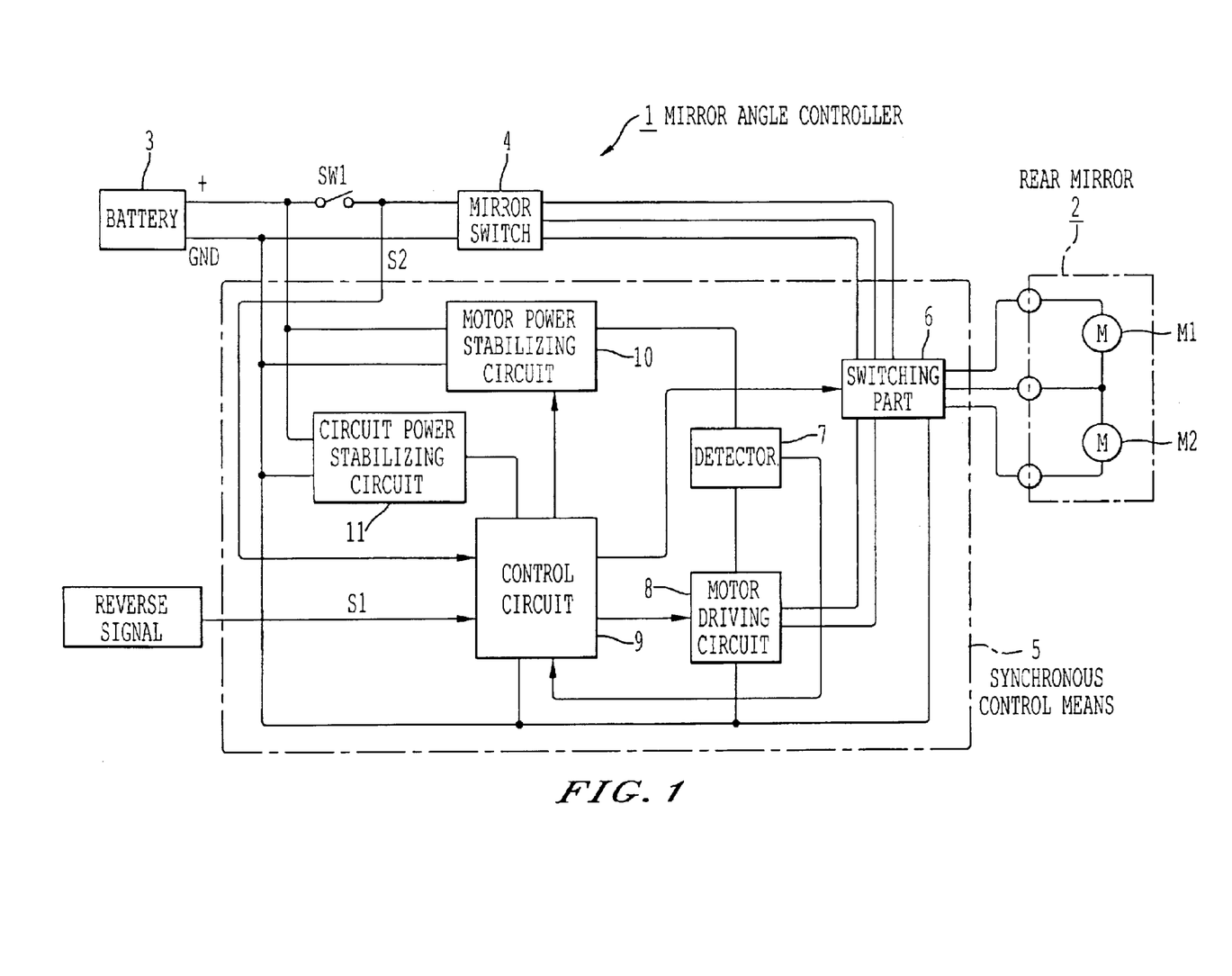
FIG. 1 is a block diagram showing an arrangement of a vehicular mirror angle controller according to one exemplified embodiment of the present invention, and a rearview mirror.
Figure 4:
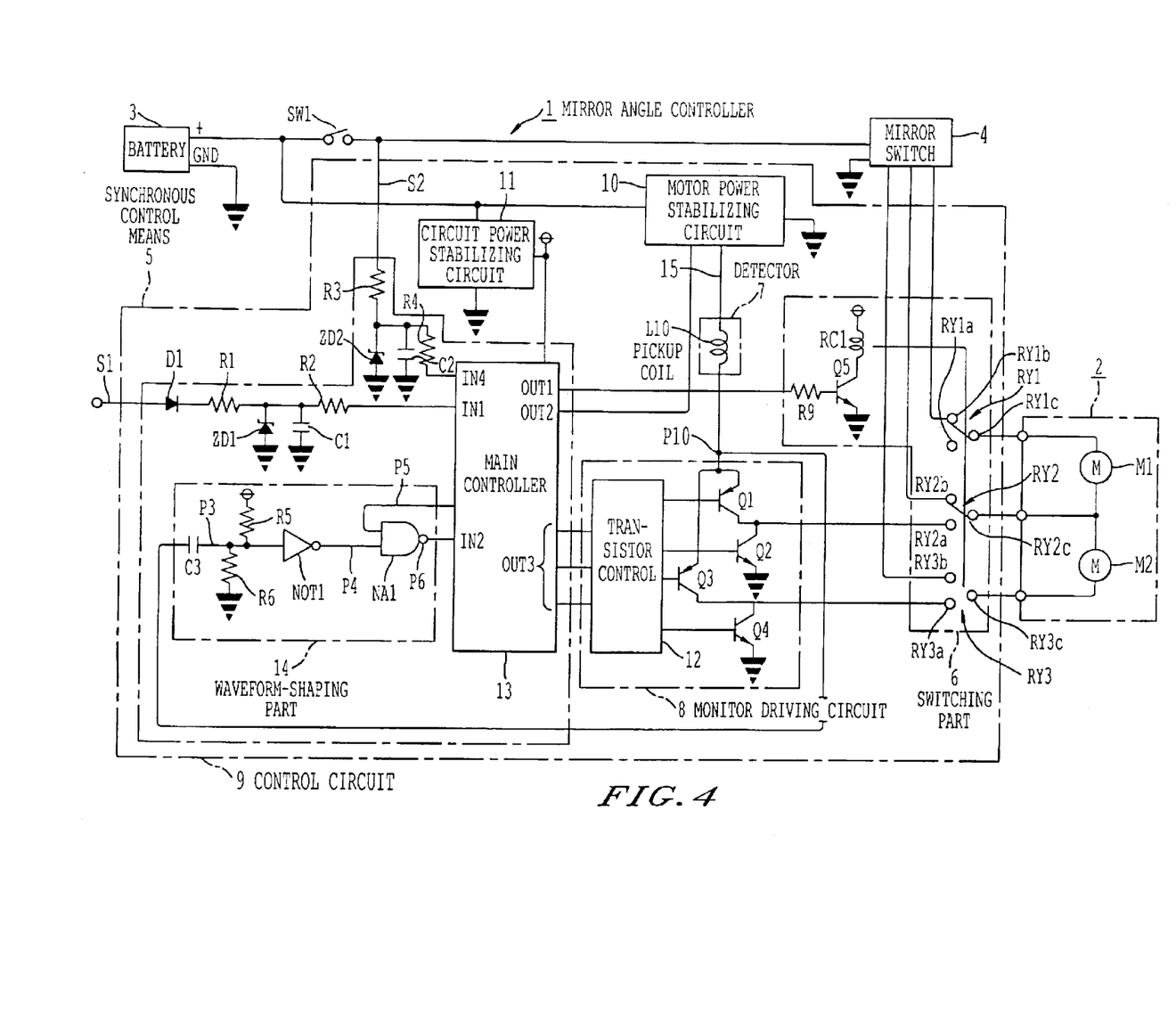
FIG. 4 is a schematic diagram indicating a specific circuit arrangement of the vehicular mirror angle controller as shown in FIG. 1, and the rearview mirror.

A preferred embodiment of the present invention will now be described with reference to the drawings. FIG. 1 is a block diagram showing an arrangement of a mirror angle controller 1 according to one exemplified embodiment of the present invention, and a rearview mirror 2, and FIG. 4 is a circuit diagram showing the arrangement more specifically. As shown in FIGS. 2 and 4, the mirror angle controller 1 reversibly controls rotation of a lateral motion motor M1 and a vertical motion motor M2 mounted in the rearview mirror 2 through manual operation, and adjusts a tilt angle of the rearview mirror 2 to a desired angle.

Further, the mirror angle controller 1 normally rotates the vertical motion motor M2 to allow the mirror to automatically tilt to a desired set position when a reverse signal (external signal) outputted upon operation of the shift lever of the vehicle to slip the gear into reverse (Reverse gear) is given, so that the driver can be provided with a view of the area near a rear wheel of the vehicle, and reversely rotates the vertical motion motor M2 to return the mirror to a home position (normal position) when a supply of the reverse signal is suspended. The reverse signal will hereinafter be taken as an example of the external signal for explanation purposes, but it is to be understood that the present invention is not restricted thereto.

As shown in FIG. 1, the mirror angle controller 1 includes a battery 3, a mirror switch 4, and a synchronous control means 5. The battery 3 is a direct current power supply. The mirror switch 4 can be operated manually to supply a voltage to the lateral motion motor M1 and the vertical motion motor M2 so that the motors M1 and M2 may rotate and allow the mirror to tilt at a desired angle. The synchronous control means 5 allows the lateral motion motor M1 and the vertical motion motor M2 to rotate through a manual operation with the mirror switch 4 under normal conditions, and if a reverse signal S1 is given, controls the rotation of the vertical motion motor M2 synchronously in response to the reverse signal S1. The lateral motion motor M1 and the vertical motion motor M2 are each comprised of a direct current brush motor.

The synchronous control means 5 includes a switching part 6 that switches between a manual operation and a synchronous operation, a detector 7 that detects a high-frequency signal generated upon switching of a brush during rotation of the vertical motion motor M2, a motor driving circuit 8 that supplies a voltage to the vertical motion motor M2 during the synchronous operation which voltage is switchable in polarity, and thereby controls the rotation of the vertical motion motor M2 in normal and reverse directions, a control circuit 9 that controls the number of rotations of the vertical motion motor M2 according to the number of pulses in the high-frequency signal detected by the detector 7, a motor power stabilizing circuit 10 that stabilizes a voltage supplied to the motor driving circuit 8, and a circuit power stabilizing circuit 11 that stabilizes a voltage supplied to the control circuit 9.

Between the mirror switch 4 and the battery 3 is provided an ignition switch SW1 that is turned ON and OFF in synchronization with the ignition of the vehicle, and an ON/OFF detection signal S2 of the ignition switch SW1 is transmitted to the control circuit 9.

As shown in FIG. 4, a direct current voltage outputted from the battery 3 is stabilized in the motor power stabilizing circuit 10, and supplied to the motor driving circuit 8. The motor driving circuit 8 is comprised of a transistor controller 12 and four transistors Q1–Q4. The transistors Q1, Q3 are pnp transistors, and the transistors Q2, Q4 are npn transistors. The transistor controller 12, during the synchronous operation, brings the transistors Q1, Q4 into conduction when the vertical motion motor M2 is to be rotated in the normal direction, while bringing the transistors Q2, Q3 into conduction when the vertical motion motor M2 is to be rotated in the reverse direction. When all of the transistors Q1–Q4 are cut off, the vertical motion motor M2 is stopped.

In a single feed line 15 extending from the motor power stabilizing circuit 10 to the motor driving circuit 8 is provided one pickup coil L10 that forms the detector 7. The polarity of the feed line 15 is fixed to be positive-going irrespective of the direction of rotation of the vertical motion motor M2 (which means that a current invariably flows in one and the same direction). Accordingly, the pickup coil L10 is used during the synchronous operation on both occasions when the vertical motion motor M2 rotates in the normal direction and when the vertical motion motor M2 rotates in the reverse direction, to detect a high-frequency signal generated upon switching of the brush of the vertical motion motor M2.

The switching part 6 includes a switching transistor Q5, a resistor R9, a relay coil RC1, and three relay contacts RY1–RY3 operated in synchronization with the relay coil RC1. Terminals RY1b, RY2b, RY3b of the relay contacts RY1–RY3 are connected to the mirror switch 4, respectively. A terminal RY1c is connected to one end of the lateral motion motor M1, while a terminal RY2c is connected to the other end of the lateral motion motor M1 and one end of the vertical motion motor M2. Moreover, a terminal RY3c is connected to the other end of the vertical motion motor M2. A terminal RY2a and a terminal RY3a are connected to an output of the motor driving circuit 8.

In the feed line 15 having a fixed polarity extending from the motor power stabilizing circuit 10 to the motor driving circuit 8, between the pickup coil L10 and the motor driving circuit 8, is provided a point 10, which is connected to the control circuit 9.

The control circuit 9 includes a main controller 13, a waveform-shaping part 14, and various kinds of circuit elements. The waveform-shaping part 14, which generates a rectangular wave for counting the number of high-frequency signals detected in the pickup coil L10, includes a series circuit which connects an alternating current path capacitor C3, an inverter circuit NOT1 and a NAND circuit NA1 in this sequence.

An input end of the alternating current path capacitor C3 is connected to one end P10 of the pickup coil L10, while an output end of the NAND circuit NA1 is connected to an input terminal IN2 of the main controller 13. Into one of input ends of the NAND circuit NA1, a rectangular wave signal (as will be described later) outputted from the main controller 13 is supplied.

A junction between the alternating current path capacitor C3 and the inverter circuit NOT1 is connected via a resistor R5 to a power supply potential, and via a resistor R6 to a ground potential.

The main controller 13 includes input terminals IN1, IN2, IN4, and output terminals OUT1–OUT3. A reverse signal S1 is supplied via a diode D1, a resistor R1, a Zener diode ZD1, a capacitor C1 and a resistor R2, to an input terminal IN1. A detection signal S2 of the ignition is supplied via a resistor R3, a Zener diode ZD2, a capacitor C2 and a resistor R4, to an input terminal IN4.

The output terminal OUT1 is connected via a resistor R9 to a base of a transistor Q5; the output terminal OUT2 is connected to the motor power stabilizing circuit 10; and the output terminal OUT3 is connected to a transistor controller 12.

Figure 5:
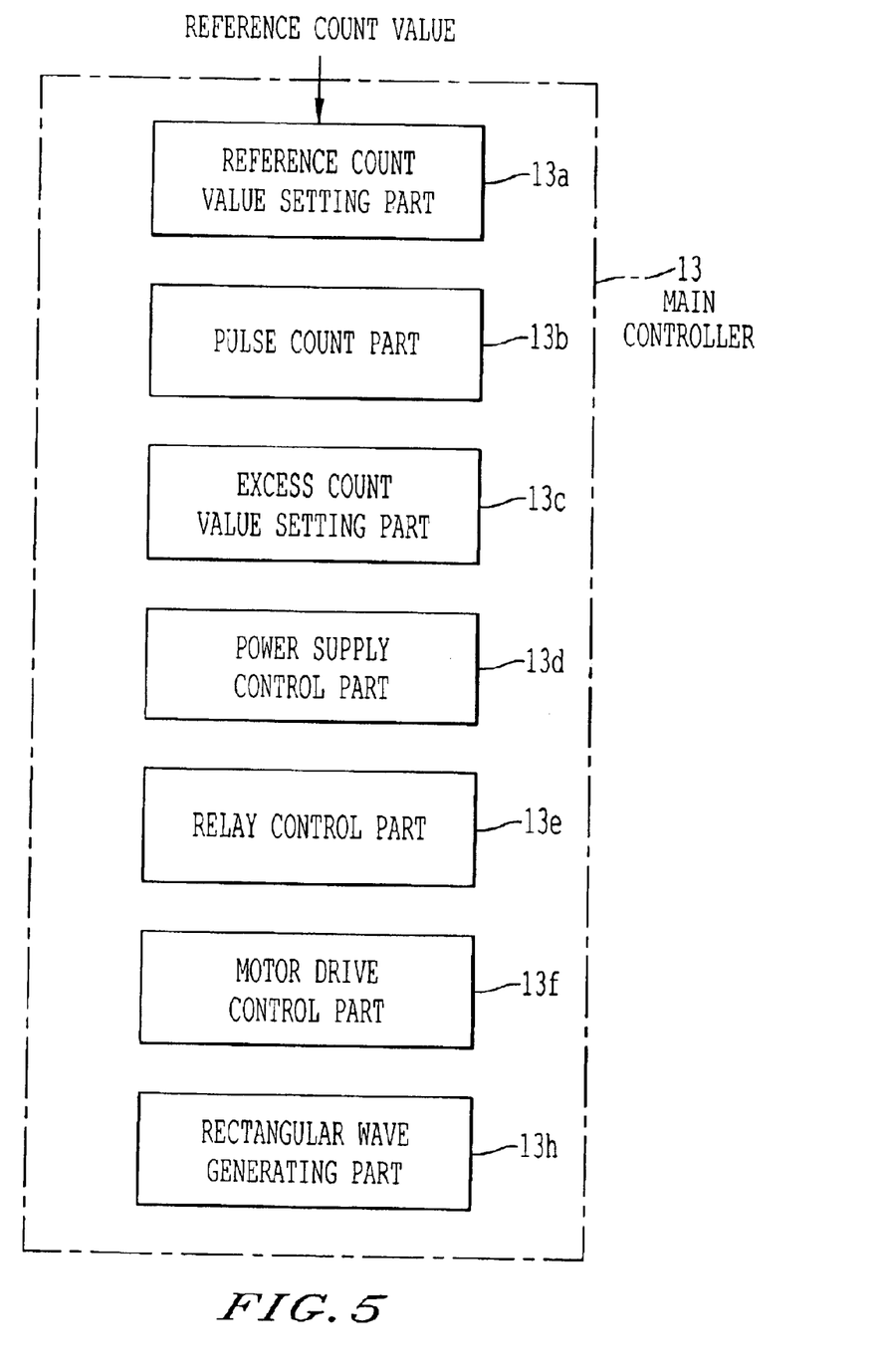
FIG. 5 is a functional block diagram showing an internal arrangement of a main controller.

FIG. 5 is a block diagram showing an internal arrangement of the main controller 13. As illustrated, the main controller 13 includes a reference count value setting part 13a, a pulse count part 13b, and an excess count value storing part 13c. A high-frequency signal is generated when the vertical motion motor M2 is normally rotated to move the mirror from the normal position to the set position and when the vertical motion motor M2 is reversely rotated to move the mirror from the set position to the normal position, and the reference count value setting part 13a presets the number of pulses in the generated high-frequency signal as a reference count value. The pulse count part 13b counts the number of pulses generated when the vertical motion motor M2 normally and reversely rotates, based upon a pulse signal given from the waveform-shaping part 14. The excess count value storing part 13c stores as an excess count value the number of pulses in the high-frequency signal generated when the vertical motion motor M2 coasts after the mirror reaches a stop position (the set position upon normal rotation, and the normal position upon reverse rotation).

The main controller 13 further includes a power supply control part 13d, a relay control part 13e, a motor drive control part 13f, and a rectangular wave generating part 13h. The power supply control part 13d exercises control which turns on the motor power stabilizing circuit 10 when a detection signal S2 of the ignition is given, and turns off the motor power stabilizing circuit 10 when the supply of the detection signal S2 is suspended. The relay control part 13e exercises control which outputs a drive signal to the base of the transistor Q5 when a reverse signal (external signal) is given, and stops outputting the drive signal after the supply of the reverse signal is suspended and the mirror angle is restored to the normal position. The motor drive control part 13f outputs a motor drive signal to the transistor controller 12. The rectangular wave generating part 13h generates a rectangular wave signal to be supplied to an input terminal of the NAND circuit NA1.

Figure 6:
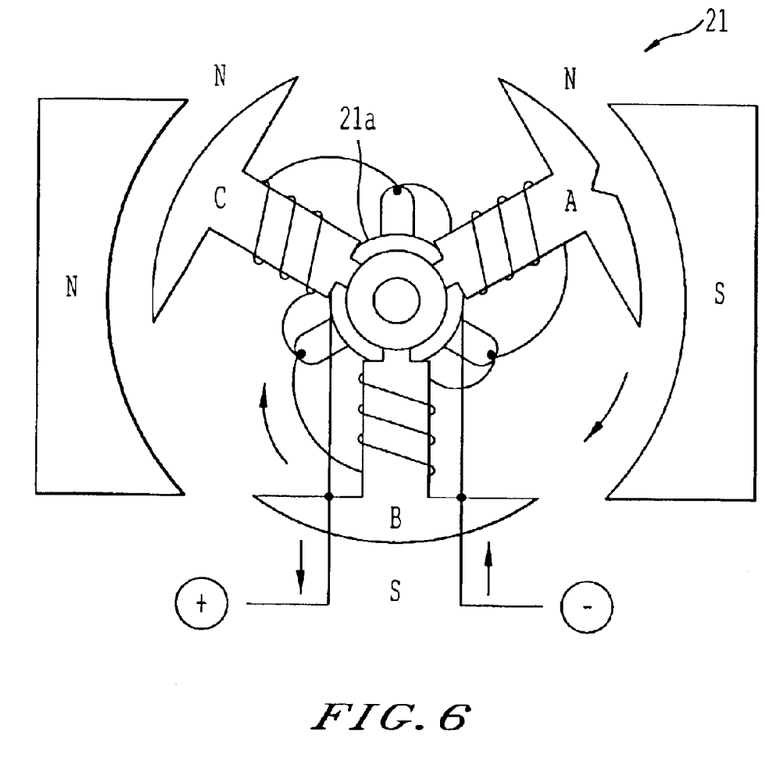
FIG. 6 is a schematic diagram showing an arrangement of a direct current brush motor.

FIG. 6 is a schematic block diagram showing an arrangement of three-pole direct current brush motor 21 used for the lateral motion motor M1 and the vertical motion motor M2.

As shown in FIG. 6, the direct current brush motor 21 includes a brush 21a in a midsection thereof. Therefore, as the motor rotates, the brush is switched six times for each one rotation, and high-frequency signal is thus generated six times for each one rotation of the motor. It is understood that the present invention is not limited to such three-pole direct current brush motor, but any other brush motors having poles different in number may be used instead.

Next, a description will be given of operation of the present embodiment having an arrangement as described above, with reference to flowchart shown in FIG. 7. As an initial setting, first of all, a driver sets, in the reference count value setting part 13a, as a reference count value, the number of pulses in the high-frequency signal generated during the period while the mirror angle moves from the normal position to the set position. To be more specific, the number of rotations of the vertical motion motor M2 required to move the mirror angle from the normal position to the set position is calculated in advance, and a pulse count value corresponding to the above number of rotations (e.g., six pulses for each one rotation of three-pole motor) is set as a reference count value, in the reference count value setting part 13a.

When the ignition of the vehicle is turned on, the ignition switch SW1 is brought into conduction, and a power supply voltage is supplied from the battery 3 to the mirror switch 4. At that stage, the relay coil RC1 of the switching part 6 is not excited, and thus relay contacts RY1–RY3 are connected to the terminals RY1b–RY3b, respectively.

Thus, by operating the mirror switch 4, the driver can reversibly apply a voltage to the lateral motion motor M1 and the vertical motion motor M2, to rotate the motors M1, M2 in the normal and reverse directions. Consequently, the tilt angle of the mirror can be set according to the driver's will and preference.

Figure 7:
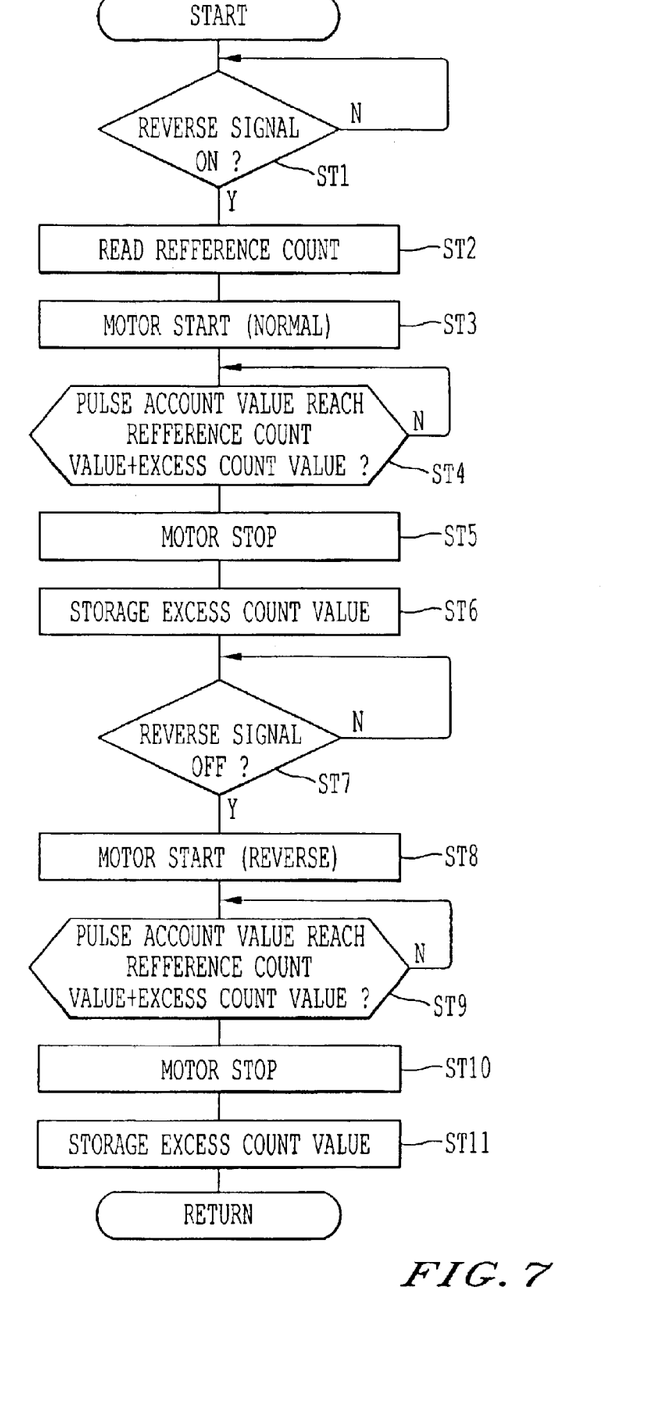
FIG. 7 is a flowchart showing an operation of the vehicular mirror angle controller according to one exemplified embodiment of the present invention.

When the driver sets the shift lever into reverse gear, a reverse signal S1 is given in synchronization therewith (YES in step ST1 of FIG. 7). The reverse signal S1 is stabilized with the Zener diode ZD1 and the capacitor C1, and supplied to the input terminal IN1 of the main controller 13.

The relay controlling part 13e as shown in FIG. 5 receives the supplied reverse signal S1, and outputs a drive signal to the base of the transistor Q5. This provides conduction between the collector and the emitter of the transistor Q5, and thus the relay coil RC1 is excited and each connection of the relay contacts RY1–RY3 is switched. That is, the relay contacts RY1–RY3 each establish connection with RY1a–RY3a.

Next, the pulse count part 13b reads the reference count value preset in the reference count value setting part 13a (step ST2), and the motor drive control part 13f outputs a motor drive control signal to the transistor controller 12. In response thereto, the transistor controller 12 outputs a drive signal to the bases of the transistors Q1, Q2. This brings the transistors Q1, Q4 into conduction, and a voltage outputted from the motor power stabilizing circuit 10 is applied to the vertical motion motor M2 in the normal direction. To be specific, a current flows through the motor power stabilizing circuit 10, the transistor Q1, the relay contact RY2, the vertical motion motor M2, there lay contact RY3, the transistor Q4, and the ground. Accordingly, a current flows in the normal direction through the vertical motion motor M2, and the vertical motion motor M2 normally rotates, so that the mirror is moved from the normal position (allowing the driver to be provided with a view of the area behind the vehicle in a normal driving situation) to the set position (allowing the driver to be provided with a view of the area near a rear wheel of the vehicle) (step ST3).

Figure 8A:
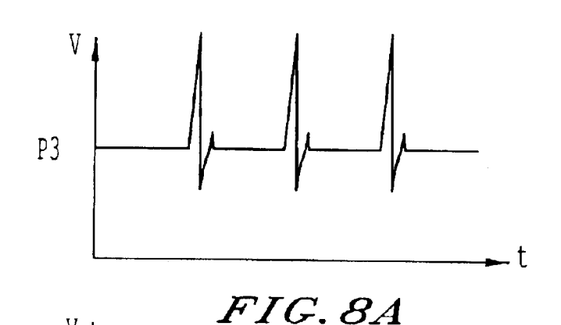
FIG. 8 depicts waveforms of each point in a waveform-shaping circuit; depicted in (a) is a signal waveform at P3, depicted in (b) is a signal waveform at P4, depicted in (c) is a signal waveform at P5, and depicted in (d) is a signal waveform at P6.

When the vertical motion motor M2 is driven to rotate, a high-frequency signal is generated upon switching of the brush associated with the rotation of the vertical motion motor M2, and the high-frequency signal is superposed on a current flowing through the vertical motion motor M2. The high-frequency signal is then detected by the pickup coil L10, and a direct current component is removed therefrom by the alternating current path capacitor C3. Further, in accordance with a ratio of voltage fraction of the resistors R5, R6 a direct current component is superposed thereon. Consequently, a signal waveform at an output point (point P3) of the alternating path capacitor C3 is, as shown in FIG. 8(a), shaped into a waveform having high-frequency signals generated in substantially regular intervals. Since a direction of the current flowing through the pickup coil L10 is kept unchanged irrespective of the direction of rotation of the vertical motion motor M2, the waveforms of the high-frequency signals generated when the vertical motion motor M2 rotates in the normal direction and that generated when the vertical motion motor M2 rotates in the reverse direction are identical with each other. Accordingly, one and the same circuit can be used for the waveform-shaping part 14 during either of the normal or reverse rotation of the vertical motion motor M2. Moreover, only one pickup coil L10 is provided in the circuit arrangement as shown in FIG. 4, and thus no such a situation as in the conventional device shown in FIG. 2 would arise in which two pickup coil L1, L2 could be subject to interaction with each other, with the result that the high-frequency signal obtained therefrom would be obtained in as large a voltage as adequate. Consequently, switching of the brush associated with rotation of the vertical motion motor M2 can be detected with high sensitivity so that errors in controlling the mirror angle may be reduced, whereby accumulation of such errors can be reduced.

Figure 8B:
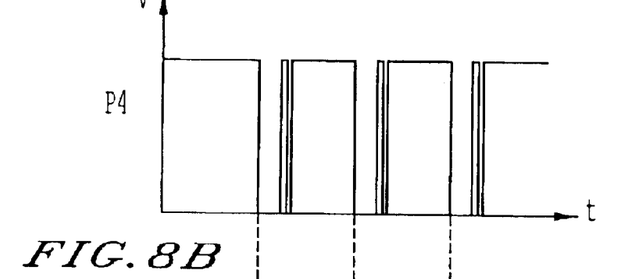

Next, the signal waveform (signal waveform at the point P3) passes through the inverter circuit NOT1 and thus is shaped into a rectangular wave as shown in FIG. 8(b). The rectangular wave generating part 13h as shown in FIG. 5 outputs a signal which constantly shows an "H" level, and this signal (corresponding to a signal at a point P5) is supplied to the NAND circuit NA1. Accordingly, an output signal (at a point P6) is switched from an "L" level to an "H" level when the signal waveform at a point P4 is switched from an "H" level to an "L" level.

Figure 8C:
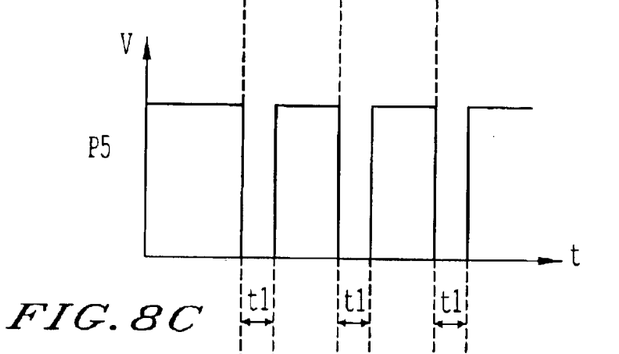
Figure 8D:
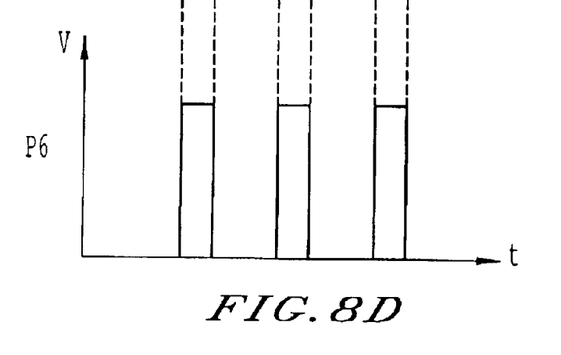

The rectangular waveform generating part 13h is then operated to output an ON signal ("L" level signal) for a predetermined period of time t1 from the time when a signal at the point P6 becomes "H" level. Accordingly, a signal waveform at the point P5 is, as shown in FIG. 8(c), shaped in such a waveform that the signal is turned ON (and keeps a "L" level) for the period of time t1 each time when a high-frequency signal is generated upon switching of the brush. Consequently, the output signal (at the point P6) of the NAND circuit NA1 is, as shown in FIG. 8(d), shaped in such a rectangular waveform signal that one pulse takes place each time when a high-frequency pulse signal is generated.

The pulse count part 13b as shown in FIG. 5 counts the number of thus-generated pulses (pulses that generate at the point P6), and when the count reaches the reference count value preset in the reference count value setting part 13a (in effect, when the count reaches the reference count value plus a previously added excess count value, but a description will be omitted herein), outputs a control signal to stop rotation of the vertical motion motor M2 to the motor drive control part 13f (YES in step ST4, and the process goes to step ST5). As a result, the transistor controller 12 stops outputting a signal for driving the transistors Q1, Q4, so that the vertical motion motor M2 is suspended to put the mirror angle in the set position.

At that stage, the vertical motion motor M2 does not stop precisely in a position at which the count of the pulses reaches the reference count value, but rather coasts for a little while and rotates farther even after the voltage is cut off. The excess count value storing part 13c stores a value excessively counted beyond the reference count value as an excess count value (step ST6).

Next, when the driver operates the shift lever to shift the gear from reverse to another position (e.g. into the drive gear), the supply of the reverse signal S1 is suspended (YES in step ST7). The transistor controller 12 then supplies a drive signal to the bases of the transistors Q2, Q3, and brings the transistors Q2, Q3 into conduction. Accordingly, a voltage outputted from the motor power stabilizing circuit 10 is applied in a reverse direction via the transistors Q3, Q2 to the vertical motion motor M2. To be more specific, a current flows through the motor power stabilizing circuit 10, the transistor Q3, the relay contact RY3, the vertical motion motor M2, the relay contact RY2, the transistor Q2, and the ground, in this sequence; thus, the vertical motion motor M2 starts rotating in the reverse direction (step ST8). Similarly, when the supply of the reverse signal S1 is suspended by turning the ignition switch SW1 off, the vertical motion motor M2 also starts rotating in the reverse direction.

The high-frequency signal generated with rotation (in the reverse direction) of the vertical motion motor M2 is detected by the pickup coil L10, and is shaped into an appropriate waveform in the waveform-shaping circuit 14, as is the case with rotation in the normal direction. Therefore, the pulse cont part 13b as shown in FIG. 5 counts the number of pulses in the high-frequency signal. Since the excess count value storing part 13c stores an excess count value of a previous round of rotation, the excess count value and the reference count value set in the reference count value setting part 13a are added up to obtain a sum, and the motor drive control part 13f outputs a control signal to reversely rotate the vertical motion motor M2 until the count reaches the sum (step ST9).

If the count reaches the sum obtained by adding the reference count value and the excess count value (YES in step ST9), a control signal to stop rotation (in the reverse direction) of the vertical motion motor M2 is outputted. As a result, the supply of the drive signal to the bases of the transistors Q2, Q3 is suspended, to stop the rotation of the vertical motion motor M2 (step ST10). At this stage, a value counted during rotation of the coasting vertical motion motor M2 is stored in the excess count value storing part 13c as a new excess count value (step ST 11). The excess count value is added to the reference count value next time when the vertical motion motor M2 is normally rotated.

Figure 9:
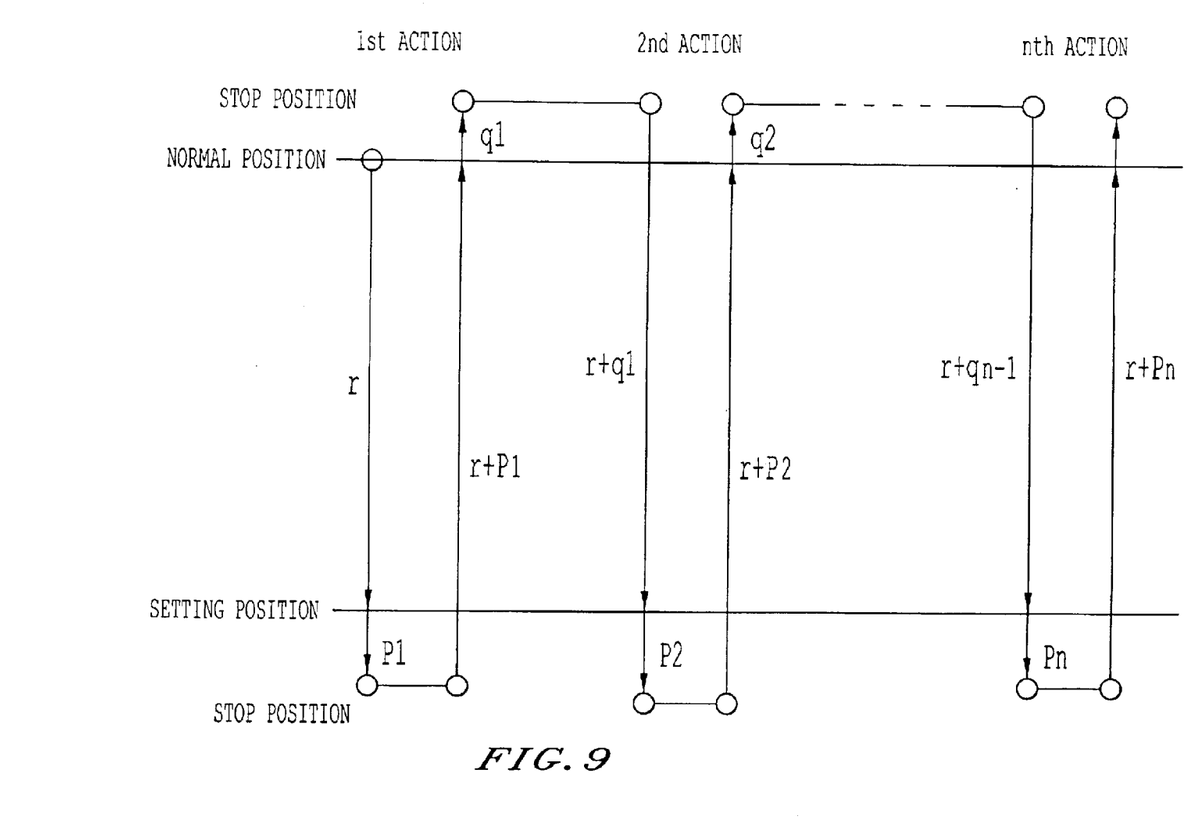
FIG. 9 is a schematic diagram for explaining a relationship between a mirror angle and the number of rotations of a vertical motion motor.

FIG. 9 is a schematic diagram showing a relationship between the mirror angle and the number of rotations of the vertical motion motor M2 during the synchronous operation. Based upon the drawing, the operation of rotation of the vertical motion motor M2 will be more specifically described below. In the drawing, an arrow extending in a downward direction denotes a normal rotation, while an arrow extending in an upward direction denotes a reverse rotation. Denoted by r is the reference count value, denoted by p1, p2, . . . pn are excess count values during the normal rotation, and denoted by q1, q2, . . . qn are excess count values during the reverse rotation.

In the first round of operation, when the vertical rotation motor M2 having the mirror placed in the normal position is rotated until the count reaches the reference count value r, the mirror arrives at the set position, but further coasts by rotation corresponding to an excess count value p1, and stops. When the vertical motion motor M2 is reversely rotated to return the mirror from the position where the mirror has stopped to the normal position, the vertical motion motor M2 is rotated until the count becomes a count value (r+p1), a value which is obtained by adding the reference count value r and the excess count value p1. As a result, the mirror, which reaches the normal position, coasts to further rotate by the excess count value q1, and stops.

Next, in the second round of the operation, the vertical motion motor M2 is normally rotated until the count reaches the count value (r+q1), a value which is obtained by adding the reference count value r and the excess count value q1. Accordingly, if the operation of rotating the vertical motion motor M2 were controlled as described above, even repeating the operation of normal and reverse rotations more than once would not result in accumulation of shifts in position due to coasting of the rotating vertical motion motor M2, but cause the position to be shifted only to such an extent as corresponding to an excess of rotation due to coasting during one round of the operation. The extent of the shift corresponding to an excess of rotation generated during one round of the operation is so small that the driver may neglect the same.

As described above, when the vertical motion motor M2 is normally rotated, the rotation is continued until the count reaches the count value obtained by adding an excess count value generated during the previous reverse rotation to the reference count value, while when the vertical motion motor M2 is reversely rotated, the rotation is continued until the count reaches the count value obtained by adding an excess count value generated during the previous normal rotation to the reference count value. Thus, the mirror angle can be prevented from being shifted.

The power supply control part 13d as shown in FIG. 5 turns the motor power stabilizing circuit 10 on when the ignition switch SW1 is turned on, and turns the motor power stabilizing circuit 10 off when the ignition switch SW1 is turned off. If the mirror is in the set position when the ignition switch SW1 is turned off, the power supply control part 13d exercises an control so that the motor power stabilizing circuit 10 is turned off after the vertical motion motor M2 is rotated in the reverse direction until the mirror reaches the normal position. Consequently, power consumption of the battery 3 can be reduced.

According to the present embodiment as described above, a high-frequency signal generated when the vertical motion motor M2 rotates is detected, and the number of pulses thereof is counted. Then, the vertical motion motor M2 is normally or reversely rotated until the count reaches a predetermined reference count value, so that the mirror is moved to the set position or the normal position. In addition, upon normal rotation of the vertical motion motor M2, an excess count value or an extra value counted beyond the reference count value during coasting of the vertical motion motor M2 is stored, and upon subsequent reverse rotation, the excess count value is added to the reference count value. Similarly, upon reverse rotation, an excess count value or an extra value counted beyond the reference count value during coasting of the vertical motion motor M2 is stored, and upon subsequent normal rotation, the excess count value is added to the reference count value.

Consequently, even if the amounts of extra rotation as a result of coasting are different between occasions upon the normal rotation and upon the reverse rotation, undesirable displacement, which would otherwise be undergone, can be corrected. Even if the operation of tilting the mirror angle to the set position in synchronization with the reverse gear is repeated more than once, the mirror angle, which would otherwise shift by degrees, can be always kept at adequate angles.

Moreover, the motor power stabilizing circuit 10 is provided, and thus the effect of fluctuations in voltage outputted from the battery 3 can be removed.

If the ignition is turned off when the mirror is in the set position, the vertical motion motor M2 is rotated in the reverse direction to return the mirror to the normal position. Therefore, when an operation is resumed next time, the mirror is in the normal position, and thus no disadvantage would be entailed when the operation is resumed again.

Further, the reference count value can be arbitrarily set using the reference count value setting part 13a, and thus the set position can be adjusted to a position most suitable for the driver.

Moreover, if a synchronous control means 5 as shown in FIG. 4 is attached to a conventional mirror for a vehicle having no mechanism for operating in synchronization with the reverse gear, an angle controller having the same features as in the present embodiment can be implemented. It is thus understood that the present embodiment can be easily retrofitted to any existing mirror assemblies with full compatibility ensured. Furthermore, no particular mechanism for tilting the mirror to the set position or position detecting means for detecting a mirror angle, or the like is required; therefore, the present embodiment can be achieved in a simplified structure at a relatively low cost.

Although the preferred embodiments of the present invention have been described above, various modifications and changes may be made in the present invention without departing from the spirit and scope thereof.

The reverse signal to be obtained when the shift lever is put into the reverse gear is taken for an example of the external signal, and the vertical motion motor M2 is taken for an example of the tilt motor operated in response to the external signal, for purposes of illustration. The present invention is however not limited to such embodiments; rather, the tilt motor may be operated in response to any other kind of signal that may be used for the external signal, and the lateral motion motor M1 may be used, instead, for the tilt motor operated in response to the external signal. For example, a blinker signal may be used for the external signal, and in response thereto, the lateral motion motor M1 may be operated to tilt the mirror.

What is claimed is:

1. A vehicular mirror angle controller comprising:
   a tilt motor comprised of a direct current brush motor that adjusts a mirror angle;
   a motor driving circuit that drives the tilt motor to rotate;
   a feed line for the tilt motor that provides connection from a direct current power supply via the motor driving circuit to the tilt motor; and
   a pickup coil provided in the feed line between the direct current power supply and the motor driving circuit to detect a high-frequency signal that is generated when a brush is switched during rotation of the tilt motor,
   wherein if an instruction is given to rotate the tilt motor by a specified amount in one of two opposite directions, the controller drives the tilt motor to rotate in the instructed direction, and controls an operation of the tilt motor according to an actual rotation amount of the tilt motor determined based upon the high-frequency signal detected by the pickup coil;

wherein polarity between the direct current power supply and the motor driving circuit is fixed, while polarity between the motor driving circuit and the tilt motor is switched according to a switching operation of the motor driving circuit based upon a driving direction instruction; and wherein one and the same pickup coil is used to detect the high-frequency signal on both occasions where the tilt motor is rotated in one of the opposite directions and where the tilt motor is rotated in the other of the opposite directions.

2. A vehicular mirror angle controller comprising:

a tilt motor comprised of a direct current brush motor to which a power supply voltage is manually applied to drive the tilt motor to rotate, so as to make a mirror angle adjustable, the tilt motor being controlled to normally rotate to tilt a mirror to a desired set position in response to a supply of an external signal, while being controlled to reversely rotate to return the mirror to a normal position in response to suspension of the supply of the external signal;

a motor driving circuit that drives the tilt motor to rotate;

a feed line for the tilt motor that provides connection from a direct current power supply via the motor driving circuit to the tilt motor;

a pickup coil provided in the feed line between the direct current power supply and the motor driving circuit to detect a high-frequency signal that is generated when a brush is switched during rotation of the tilt motor;

a pulse counter that counts the number of pulses in the high-frequency signal detected by the pickup coil; and a rotation angle correcting means that detects as an excess count value the number of pulses in the high-frequency signal corresponding to extra rotation of the tilt motor coasting beyond the set position when the tilt motor is normally rotated to adjust the mirror angle to the set position and beyond the normal position when the tilt motor is reversely rotated to adjust the mirror angle to the normal position, and based upon the detected excess count value corrects a rotation amount of the mirror to be rotated next time when the tilt motor is reversely rotated to adjust the mirror angle to the normal position and when the tilt motor is normally rotated to adjust the mirror angle to the set position, wherein polarity between the direct current power supply and the motor driving circuit is fixed, while polarity between the motor driving circuit and the tilt motor is switched according to a switching operation of the motor driving circuit based upon a driving direction instruction; and wherein one and the same pickup coil is used to detect the high-frequency signal on both occasions where the tilt motor is normally rotated and where the tilt motor is reversely rotated.

3. A vehicular mirror angle controller comprising:

a tilt motor comprised of a direct current brush motor to which a power supply voltage is manually applied to drive the tilt motor to rotate, so as to make a mirror angle adjustable, the tilt motor being controlled to normally rotate to tilt a mirror to a desired set position in response to a supply of an external signal, while being controlled to reversely rotate to return the mirror to a normal position in response to suspension of the supply of the external signal;

a motor driving circuit that drives the tilt motor to rotate in one of normal and reverse directions based upon a motor drive control signal;

a feed line for the tilt motor that provides connection from a direct current power supply via the motor driving circuit to the tilt motor;

a pickup coil provided in the feed line between the direct current power supply and the motor driving circuit to detect a high-frequency signal that is generated when a brush is switched during rotation of the tilt motor;

a pulse counter that counts the number of pulses in the high-frequency signal detected by the pickup coil;

a reference count value setting means that sets as a reference count value the number of pulses in the high-frequency signal counted by the pulse counter when the tilt motor is normally rotated to adjust the mirror angle to the set position and when the tilt motor is reversely rotated to adjust the mirror angle to the normal position;

an excess count value storing means that stores as an excess count value the number of pulses in the high-frequency signal corresponding to extra rotation of the tilt motor coasting beyond the set position when the tilt motor is normally rotated to adjust the mirror angle to the set position and beyond the normal position when the tilt motor is reversely rotated to adjust the mirror angle to the normal position; and a motor drive controller that outputs a motor drive control signal instructing the tilt motor to rotate next time reversely to adjust the mirror angle to the normal position and normally to adjust the mirror angle to the set position by such a rotation amount that the number of pulses in the high-frequency signal to be generated when the tilt motor is rotated becomes the number of pulses obtained by adding the excess count value to the reference count value, wherein polarity between the direct current power supply and the motor driving circuit is fixed, while polarity between the motor driving circuit and the tilt motor is switched according to a switching operation of the motor driving circuit based upon a driving direction instruction; and wherein one and the same pickup coil is used to detect the high-frequency signal on both occasions where the tilt motor is normally rotated and where the tilt motor is reversely rotated.

4. A vehicular mirror angle controller according to any one of claims 2 and 3, further comprising:

a waveform-shaping means that shapes a waveform of the high-frequency signal detected by the pickup coil so as to generate a rectangular wave as a unit corresponding to one switching operation of a brush; and a rectangular wave generating means that generates another rectangular wave which is turned on and kept for a specific period in synchronization with timing of generation of the rectangular wave as a unit, wherein the pulse counter counts the number of pulses in a pulse signal obtained through a logic operation of an output signal from the waveform-shaping means and an output signal from the rectangular wave generating means.

5. A vehicular mirror angle controller according to claim 1, wherein the direct current power supply includes a battery and a motor power stabilizing circuit that stabilizes an output voltage of the battery to supply the stabilized voltage to the motor driving circuit; and wherein the pickup coil is provided between the motor power stabilizing circuit and the motor driving circuit.

6. A vehicular mirror angle controller according to claim 2, wherein the direct current power supply includes a battery and a motor power stabilizing circuit that stabilizes an output voltage of the battery to supply the stabilized voltage to the motor driving circuit; and wherein the pickup coil is provided between the motor power stabilizing circuit and the motor driving circuit.

7. A vehicular mirror angle controller according to claim 3, wherein the direct current power supply includes a battery and a motor power stabilizing circuit that stabilizes an output voltage of the battery to supply the stabilized voltage to the motor driving circuit; and wherein the pickup coil is provided between the motor power stabilizing circuit and the motor driving circuit.

8. A vehicular mirror angle controller according to claim 4, wherein the direct current power supply includes a battery and a motor power stabilizing circuit that stabilizes an output voltage of the battery to supply the stabilized voltage to the motor driving circuit; and wherein the pickup coil is provided between the motor power stabilizing circuit and the motor driving circuit.

* * * * *